July 24, 1962  P. J. BARNES  3,046,398
EQUIPMENT FOR STERILIZING CARTS
Filed July 6, 1959
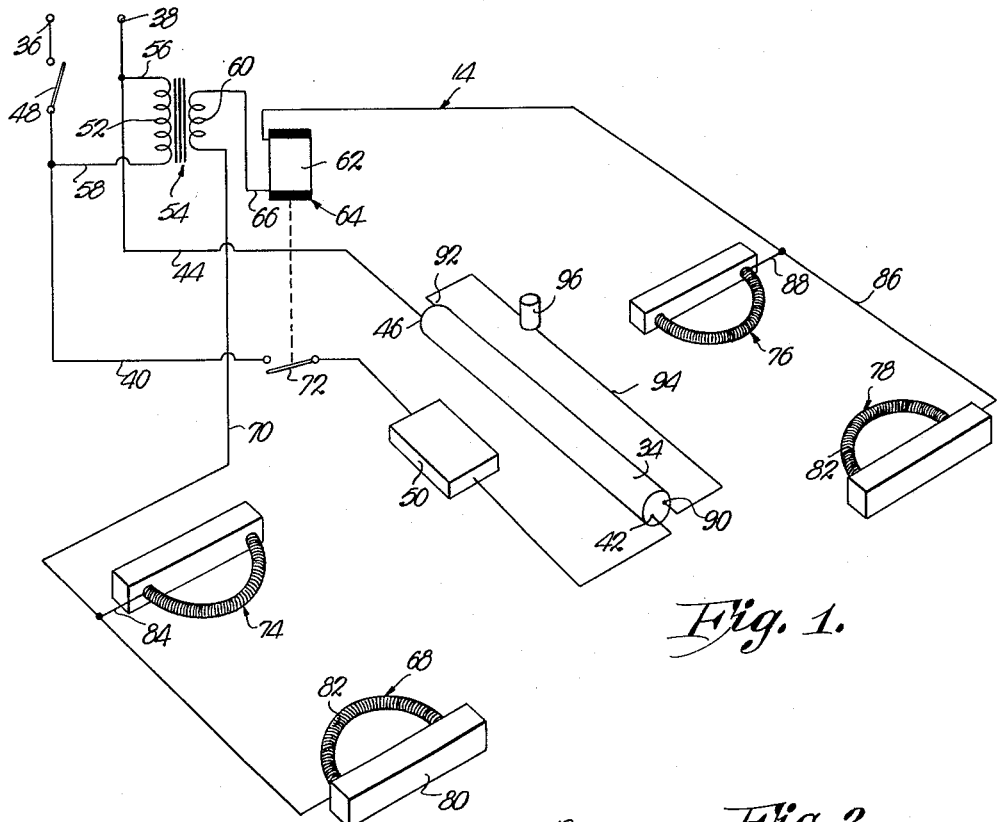
Fig. 1.
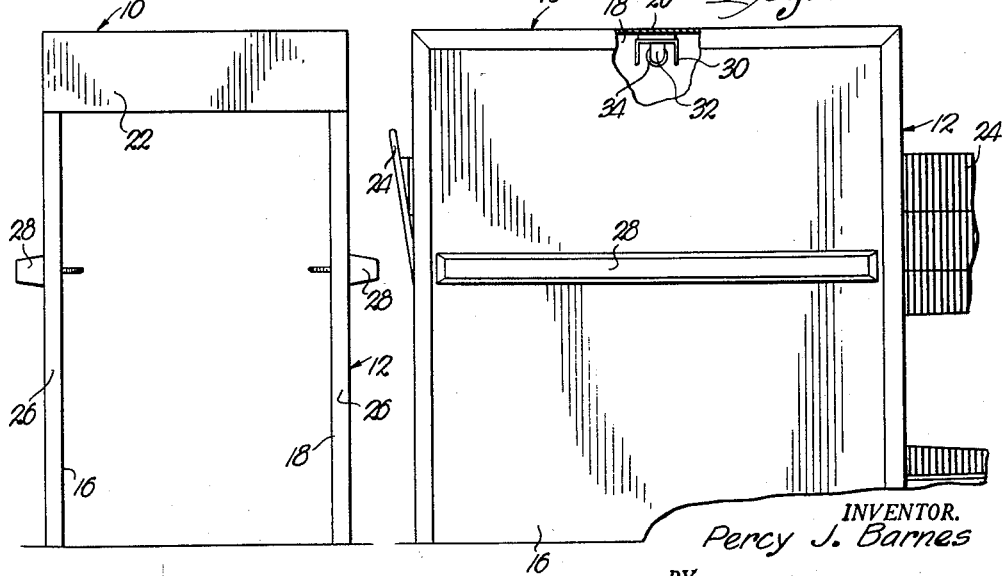
Fig. 2.
Fig. 3.
INVENTOR.
Percy J. Barnes
BY
Hovey, Schmidt, Johnson & Hovey
ATTORNEYS.

United States Patent Office 3,046,398
Patented July 24, 1962

3,046,398
EQUIPMENT FOR STERILIZING CARTS
Percy J. Barnes, Wilmington, Del., assignor to Advanced Development Association, Ltd., Kansas City, Mo., a corporation of Delaware
Filed July 6, 1959, Ser. No. 825,196
6 Claims. (Cl. 250—51)

This invention relates to sterilizing equipment and particularly to apparatus especially adapted for sterilizing metal carts of the type commonly employed in supermarkets and similar merchandising outlets.

Metal carts of the type which may be stored in relatively telescoped relationship have been extensively used in recent years by grocery and other similar retail stores, but in view of the fact that many different persons use each cart during the useful life thereof, it can be recognized that health problems are presented since, in many instances, unwrapped food products are placed in the carts and furthermore, certain ones of the latter have special means thereon permitting customers to place their children in the cart while pushing the latter through the store.

It is, therefore, the primary object of the present invention to provide efficient and economical equipment for sterilizing metal carts which are conventionally used in retail stores and that may be stored in telescoped relationship thus eliminating the health hazards previously encountered by virtue of deleterious bacteria and germs being deposited on the carts during normal utilization thereof.

It is a further important object of the invention to provide sterilizing equipment for wheeled carts which provide electrically operated sterilizing structure therewithin for directing sterilizing rays onto the carts during advancement of the same through the equipment whereby the unit cost of the sterilization procedure is extremely low and a cumulative sterilization result is obtained by virtue of the fact that the carts are passed through the equipment a relatively large number of times during each day of use of such carts.

Another very important object of the invention is to provide sterilization equipment as defined above wherein is included novel means for maintaining the radiation sterilizing structure in an inactive condition unless the sterilizer housing is completely filled with carts whereby it is impossible for children to walk into the area of direct radiation from the electrically operated sterilizing structure and which would produce deleterious effects by virtue of the nature of the ultraviolet radiation normally emanating from structure of the character contemplated by the present invention.

A still further important object of the invention is to provide cart sterilization equipment wherein improved electrical control means is operably coupled with the ultraviolet radiation source in order to selectively actuate the latter only when the sterilizer housing is completely filled with carts in telescoped relationship with the electrical control structure being constructed to preclude operation of the radiation source unless the housing is filled with carts by virtue of the fact that such carts comprise a necessary part of the circuit in order that the ultraviolet lamp may be energized.

An additional important object of the invention is to provide sterilization equipment for carts of the type set forth above and which is adapted to be employed with various sizes of carts without modification of the equipment being required.

Other important objects and details of construction of the present equipment will become obvious or explained in greater detail as the following specification progresses.

In the drawing:
FIG. 1 is a perspective, schematic representation of the electrical components forming a part of the present cart sterilizing equipment;

FIG. 2 is a side elevational view of the sterilizer housing, certain parts thereof being broken away and others in section to reveal details of construction of the equipment; and FIG. 3 is an end elevational view of the housing shown in FIG. 2.

Sterilization equipment broadly numerated 10 in the drawing, preferably comprises a housing designated 12 and electrical control sterilization and circuit means 14.

Housing 12 has a pair of opposed, parallel, upright, substantially rectangular side walls 16 and 18 which are maintained in proper spaced relationship by horizontal, rectangular top wall 120. Wall 20 is connected to the upper margins of respective side walls 16 and 18 and to opposed, relatively transversely, narrow end panels 22 at opposite upright edges of side walls 16 and 18. Top wall 20 is of sufficient width to maintain side walls 16 and 18 in spaced relationship to receive conventional wheeled, metal grocery carts 24 with side walls 16 and 18, as well as end panels 22 defining a passage through housing 12 whereby carts 24 may be advanced through equipment 10 in telescoped disposition as best shown in FIG. 2.

Angles 26 are provided at the upright corners of housing 12, as well as along opposed, horizontal, upper margins thereof in order to reinforce the housing 12 and provide protection for the same, and by the same token, it is to be preferred that elongated, normally horizontal, outwardly extending bumpers 28 be provided on opposed, outer surfaces of the side walls 16 and 18 in order to preclude damage to housing 12 by carts 24.

It is to be understood that the lower margins of walls 16 and 18, as well as angles 26, may be suitably bolted to a supporting surface if desired, in order to preclude movement of housing 12.

A transversely U-shaped shield 30 secured to the under face of top wall 20 in an inverted position and substantially spanning the distance between opposed side walls 16 and 18, mounts a pair of opposed, depending sockets 32 adapted to receive an elongated, ultra-violet lamp 34, as best illustrated in FIG. 2. The ends of channel shield 30 are open, and, therefore, it is not required that lamp 34 extend the full length of shield 30 inasmuch as the radiations emanating from the lamp 34 are projected downwardly in all directions onto carts 24 positioned within housing 12.

Electrical means 14 includes a pair of terminals 36 and 38 adapted to be connected to a source of conventional A.C. power with conduit 40 leading from terminal 36 to one contact pin 42 of lamp 34, and another conduit 44 extending from terminal 38 to contact pin 46 of lamp 34. Interposed in conduit 40 are a manually operated, single-throw, single-pole switch 48, and a conventional lamp ballast 50.

The primary coil 52 of step-down transformer 54 is connected to conduit 44 by lead 56 and to conduit 40 by lead 58. The secondary coil 60 of transformer 54 is connected to coil 62 of relay 64 by a line 66, while the opposite terminal of secondary coil 60 is connected to a contact 68 by conduit 70. The single-pole switch 72 of relay 64 is interposed in conduit 40 for interrupting flow of current to lamp 34 upon opening of switch 72.

In addition to contact 68, electrical means 14 includes contacts 74, 76 and 78 which are positioned adjacent respective upright, outer margins of side walls 16 and 18. Each of the contacts 68, 74, 76 and 78 comprises an elongated block of insulating material 80 suitably secured to the innermost face of a corresponding side wall 16 and 18, as well as an elongated, longitudinally arcuate, flexible element 82 which preferably is a coil spring or the like. Lead 84 couples contact 74 with conduit 70, while line 86 interconnects contact 78 and coil 62 of relay 64. Another lead 88 is connected to line 86 and contact 76 respectively. Opposed pins 90 and 92 of lamp 34 are interconnected by conduit 94 having a starter 96 interposed therein.

In operation, when it is desired to sterilize metal carts such as 24, manual switch 48 is closed to permit current to flow through primary coil 52 of transformer 54. Electrical energy will not flow into lamp 34 because switch means 72 of relay 64 is open during de-energization of coil 62. Therefore, lamp 34 will not be energized until housing 12 is completely filled with carts 24 and which thereby bridge conduits 68 and 78 or 74 and 76 respectively, in order to permit passage of current to coil 62 through, for example, conduit 70, lead 84, element 82 of contact 74, the metal components of carts 24, element 82 of contact 76, lead 88, line 86, coil 62, and line 66 connected to the secondary coil 60 of step-down transformer 54.

An alternative path would be through element 82 of contact 68, the metal components of carts 24, and element 82 of contact 78. It can also be seen that current may pass through all of the contacts 68, 74, 76 and 78 if carts 24 are of sufficient width to be in engagement with all of such contacts while disposed within housing 12. Passage of current through coil 62 of relay 64 causes switch 72 to be closed, thereby permitting energization of lamp 34 through conduit 40 and 44.

It is pointed out that transformer 54 steps down the current directed to coil 62 of relay 64 a sufficient extent to prevent a person from being shocked by touching any of the carts 24 while the same are within housing 12. It is also to be recognized that the secondary circuit coupled with relay 64, is not grounded and therefore, passage of current through the circuit cannot be effected in the absence of one or more carts 24 being disposed in bridging relationship to contacts 68, 74, 76 and 78.

Since housing 12 must be filled with a number of carts 24 before lamp 34 is energized, in a manner outlined above, it can be recognized that children cannot enter the tunnel or passage presented by housing 12, and thus precluding eye damage by virtue of direct observation of lamp 34. Shield 30 additionally prevents direct rays from lamp 34 from passing outwardly from housing 12 and restricts such rays to the space normally occupied by carts 24 between opposed side walls 16 and 18.

Although only one lamp 34 has been illustrated, it is to be understood that one or more of such lamps may be provided as needed and depending upon the longitudinal length of housing 12 in order to provide effective sterilization of carts 24 passed through the present equipment.

Having thus described the invention what is claimed as new and desired to be secured by Letters Patent is:

1. Equipment for sterilizing wheeled carts comprising a housing having a top wall and a pair of opposed sidewalls depending from the top wall, said walls presenting a passage permitting the carts to be advanced through the housing; electrically operated radiation sterilizing structure within said housing and disposed to direct sterilizing rays downwardly onto carts therebeneath as the latter are advanced through the passage of the housing; electrical source means connected to said structure for energizing the latter; and mechanism interposed in said electrical source means and including components carried by the housing at each end of the passage therethrough and extending into the latter in positions to be engaged by the carts as the latter are advanced through the housing for effecting selective energization of said sterilizing structure, said mechanism being electrically coupled to said electrical source means to permit energization of the latter only when the carts are in simultaneous engagement with the components at each end of the passage through said housing.

2. Equipment as set forth in claim 1 wherein said housing is of inverted, substantially U-shaped configuration in transverse section perpendicular to the longitudinal length of said passage and said sterilizing structure extends transversely of said housing in overlying relationship to said passage therethrough.

3. Equipment for sterilizing wheeled carts comprising a housing having a top wall and a pair of opposed sidewalls depending from the top wall, said walls presenting a passage permitting the carts to be advanced through the housing; electrically operated radiation sterilizing structure within said housing and disposed in a position substantially overlying said passage to direct sterilizing rays onto the carts as the latter are advanced through the passage; primary electrical source means connected to said structure for energizing the latter; switch means interposed in said primary source means; electrically responsive mechanism coupled with said switch means for opening and closing the latter; and electrical circuit means operably connected to said mechanism and including components and disposed at opposed ends of said passage through the housing in positions to be engaged by said carts for effecting closing of said circuit means and selective actuation of the mechanism to close said switch thereby energizing the sterilizing structure only when the carts are in simultaneous engagement with the components at each end of the passage through said housing.

4. Equipment for sterilizing wheeled metal carts comprising a housing having a top wall and a pair of opposed sidewalls depending from the top wall, said walls presenting as passage permitting the carts to be advanced through the housing; electrically operated radiation sterilizing structure within said housing and disposed in a position substantially overlying said passage to direct sterilizing rays onto the carts as the latter are advanced through the passage; primary electrical source means connected to said structure for energizing the latter; switch means interposed in said primary source means; electrical mechanism operated by relatively low voltages and coupled with said switch means for closing the latter only during energization of said mechanism; contacts secured to the housing at opposed ends of said passage therethrough and extending into the passage in positions to be engaged by said carts as the latter are advanced through the housing; and secondary electrical source means of relatively low voltage connected to one of said contacts, there being conduit means electrically connecting the other contact to said mechanism whereby the mechanism is energized to effect closing of said switch means and thereby energization of said sterilizing structure only when the metal carts are in bridging relationship to said contacts to provide a path for flow of current therebetween.

5. Equipment as set forth in claim 4 wherein said contacts each comprise an elongated, longitudinally arcuate, flexible, conductive element extending into the passage through said housing.

6. Equipment as set forth in claim 4 wherein said secondary source means and the conduit means are coupled with said primary source means through a stepdown transformer.

References Cited in the file of this patent

UNITED STATES PATENTS

| 2,249,473 | Jackson et al. | July 15, 1941 |
| 2,272,893 | Bosomworth | Feb. 10, 1942 |
| 2,763,735 | Wahl | Sept. 18, 1956 |
| 2,822,476 | Osgood | Feb. 4, 1958 |